A. ANDERSON.
NUT LOCK.
APPLICATION FILED JUNE 26, 1919.
1,344,845.
Patented June 29, 1920.
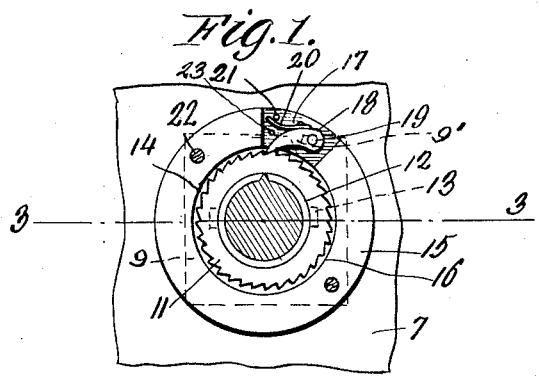
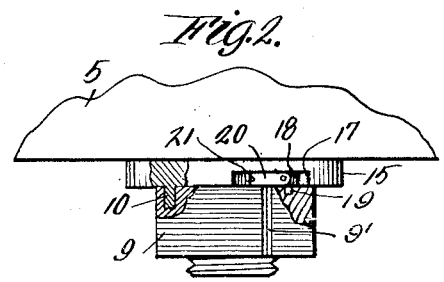
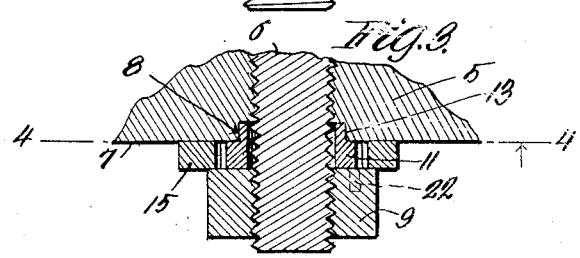
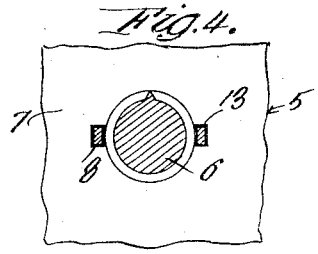
Inventor
ALFRED ANDERSON
WITNESSES
By Richard B. Owen
Attorney

UNITED STATES PATENT OFFICE.

ALFRED ANDERSON, OF GOODHUE, MINNESOTA.

NUT-LOCK.

1,344,845. Specification of Letters Patent. Patented June 29, 1920.

Application filed June 26, 1919. Serial No. 306,907.

*To all whom it may concern:*

Be it known that I, ALFRED ANDERSON, a citizen of Sweden, residing at Goodhue, in the county of Goodhue and State of Minnesota, have invented certain new and useful Improvements in Nut-Locks, of which the following is a specification.

My invention relates to new and useful improvements in nut locks, and has for its object to provide means for preventing reverse rotation of the nut after it has been driven home, which means may be used upon the bolts and nuts now in constant use.

Another object of my invention is to provide a device of the above mentioned character embodying means whereby the nut becomes automatically locked against reverse rotation upon the bolt, after the nut has been driven home.

The means I employ for locking a nut upon the bolt, embodies a pair of washers, one of which is made stationary in relation to the bolt by the provision of means upon the stationary washer coöperating with particularly formed means in the work through which the bolt extends.

A still further object of the invention is to provide a device of the above mentioned character embodying a rotatable washer which may be temporarily locked to the nut whereby the rotatable washer is caused to rotate in unison with said nut.

Other objects and advantages of the invention will become apparent during the course of the following description.

In the drawings, forming a part of the description and wherein like numerals are employed to designate like parts throughout the same, Figure 1 is a top plan of the invention.

Fig. 2 is a side elevation, parts thereof being broken away.

Fig. 3 is a transverse section taken on the line 3—3 of Fig. 1, and

Fig. 4 is a transverse section taken on the line 4—4 of Fig. 3.

In the drawings, wherein is shown a preferred embodiment of my invention, the numeral 5 designates the work through which extends a bolt 6 of the usual construction. The outer face 7 of the work, as more clearly shown in Figs. 3 and 4, is provided with a pair of oppositely disposed, preferably rectangular shaped recesses 8 disposed upon opposite sides of the bore through the work to accommodate the usual bolt. A nut 9 has its inner face provided with a pair of outwardly extending recesses 10, which are provided adjacent opposite corners of the nut, and a recess 9′ is provided in one side of the nut for a purpose which will presently appear.

A stationary washer 11 having a central opening 12 therein, is positioned upon the bolt adjacent the outer face 7 of the work, and is retained stationary with relation to the work and bolt, through the medium of a pair of oppositely disposed projections 13, which extend inwardly of the work from the inner face of the washer and are preferably rectangular in cross section to be snugly received in the oppositely disposed recesses 8 in the work. These projections are arranged adjacent the opening 12 through the washer and are preferably formed when stamping out the washer 11, then are bent to extend at substantially right angle to the washer proper. The outer periphery of the washer 11 is provided with a plurality of ratchet teeth 14 for a purpose which will presently appear.

A second washer 15 is also provided for in my invention and is equipped with the usual central opening 16 of sufficient size whereby the washer 15 may surround the stationary washer 11 and so that the periphery of the central opening 16 is slightly spaced from the ratchet teeth 14 whereby the outer washer 15 may readily rotate around the inner washer. The outer face of the rotatable washer 15 is recessed as at 17 to a depth substantially one half the thickness of the washer whereby a pawl 18 may be pivoted therein by means of a pivot pin 19 which is extended into a recess 19′ in the nut. As clearly shown, the pawl is slightly arcuated and extends inwardly so that its pointed working end extends inwardly of the periphery of the central opening 16 to engage with the ratchet teeth 14 of the stationary washer. In order that the pawl is normally retained in operative relation with the ratchet teeth, I secure an arcuated flat spring by one end to said pawl and provide an outwardly extending pin 21 in the bottom of the recess 17 for the abutment of the free end of this spring. A pair of oppositely disposed outwardly extending pins or projections 22 are provided upon the outer face of the outer washer 15 to be snugly received in the oppositely disposed openings or recesses 10 in the inner face of the nut 9. When the pins 22 are received in these recesses 10, it will be readily apparent that by rotating the nut, the outer washer is rotated also. A recess 23 is provided in the bottom of the recess 17 adjacent the spring to receive a pin for retaining the pawl inoperative.

To use the invention and lock a nut upon a bolt, a usual bolt 6 is passed through the work 5 so that the threaded end of the bolt extends beyond the face 7 of the work having the oppositely disposed recesses 8 therein. The inner stationary washer 11 is then passed over the threaded end of the bolt so that its inner face abuts with the outer face of the work, and the projections 13 are received in the recesses 8. When the stationary washer is in this position, it will be readily apparent that rotation thereof is prevented. The outer rotatable washer 15 is then passed over the threaded end of the bolt until the inner or stationary washer 11 is arranged within the central opening 16 through the rotatable washer and the inner face of the rotatable washer abuts with the work. When the washers assume the above position, it will be seen that the pawl 20 engages with one of the ratchet teeth 14 of the outer periphery of the stationary washer 11. Therefore, rotation of the outer washer in one direction is prevented. A nut 9 is then threaded or driven home upon the threaded end of the bolt in the usual manner, until it is arranged in close proximity to the outer face of the rotatable washer 15, at which time the rotatable washer is rotated in one direction until the ends or projections 22 thereon are arranged so that they may be received within the oppositely disposed openings 10 in the bottom of the nut. When the inner face of the nut abuts with the outer face of the rotatable washer, it will be seen that the pins 22 by their reception in the opening 10 of the nut will cause the rotatable washer to turn with the nut. Then, by rotating the nut further to drive the same home, the rotatable washer 15 will be carried therewith which will cause the pawl 20 to travel over the several ratchet teeth 14 of the inner stationary washer.

After the nut has been tightened up sufficiently upon the bolt, it will be seen that reverse rotation of the nut will be prevented by the pawl 20 engaging with the ratchet teeth 14.

When it is desired to remove the nut, a suitable prying tool may be manipulated in recess 9' to withdraw the pawl outwardly, sufficiently for a pin to be inserted in the recess 23 to retain the pawl out of engagement with the ratchet teeth so that the nut may rotate reversely and off of the bolt.

The foregoing description and the drawings have reference to what may be considered the preferred, or approved form of invention. It is to be understood that I may make such changes in construction and arrangement of parts, materials, dimensions, etc., as may prove expedient and fall within the scope of the appended claim.

Having thus fully described my invention, what I claim as new and desire to secure by Letters Patent, is:

The combination with a bolt and nut, of a stationary washer on said bolt and provided with a plurality of peripheral ratchet teeth, an independent washer rotatable around said stationary washer and rotatable with said nut, said rotatable washer having an enlarged central opening whereby it is arranged to surround said stationary washer, the face of said rotatable washer adjacent the nut being recessed, a spring pressed pawl pivotally mounted in said recess and having its working end projected inwardly of said opening in the washer for engagement with the ratchet teeth of said stationary washer, said nut being adapted to cover the working end of the pawl, and the side of the nut adjacent the pawl having a groove therein for the reception of a tool to disengage the pawl from the teeth of the stationary washer.

In testimony whereof I, affix my signature in presence of two witnesses.

ALFRED ANDERSON.

Witnesses:
 Chas. F. Sawyer,
 Gertrude O'Reilly.